(12) United States Patent
Hill et al.

(10) Patent No.: US 7,496,899 B2
(45) Date of Patent: Feb. 24, 2009

(54) PREVENTING LOSS OF TRACED INFORMATION IN A DATA PROCESSING APPARATUS

(75) Inventors: Stephen John Hill, Austin, TX (US); Glen Andrew Harris, Austin, TX (US); David James Williamson, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 11/205,310

(22) Filed: Aug. 17, 2005

(65) Prior Publication Data

US 2007/0050600 A1    Mar. 1, 2007

(51) Int. Cl.
   *G06F 9/44* (2006.01)
   *G06F 9/00* (2006.01)
(52) U.S. Cl. .................. 717/127; 717/128; 712/227; 712/216; 712/214
(58) Field of Classification Search .................. 712/227, 712/216, 214; 717/127, 128
   See application file for complete search history.

(56) References Cited

U.S. PATENT DOCUMENTS

| | | | | |
|---|---|---|---|---|
| 5,724,505 | A * | 3/1998 | Argade et al. ................. | 714/45 |
| 5,752,013 | A * | 5/1998 | Christensen et al. ......... | 712/227 |
| 6,148,381 | A * | 11/2000 | Jotwani ....................... | 711/158 |
| 6,421,795 | B2 * | 7/2002 | Yamashita ................... | 714/45 |
| 6,615,370 | B1 * | 9/2003 | Edwards et al. .............. | 714/45 |
| 2003/0229823 | A1 * | 12/2003 | Swaine et al. ................. | 714/25 |
| 2004/0030962 | A1 * | 2/2004 | Swaine et al. ................. | 714/45 |
| 2004/0102950 | A1 * | 5/2004 | Agarwala et al. ............. | 703/23 |
| 2005/0210223 | A1 * | 9/2005 | Caprioli et al. ............. | 712/220 |

* cited by examiner

*Primary Examiner*—Eddie P Chan
*Assistant Examiner*—Idriss N Alrobaye
(74) *Attorney, Agent, or Firm*—Nixon & Vanderhye P.C.

(57) ABSTRACT

Techniques for preventing the loss of trace information being transmitted via trace infrastructure are disclosed. A data processing apparatus for processing instructions is provided. The data processing apparatus comprises: decode/issue logic operable to receive and decode an instruction to be processed by the data processing apparatus and to determine when to issue a decoded instructions for execution by execution logic; execution logic operable to execute the decoded instructions; interface logic selectively operable to receive trace information relating to the state of the data processing apparatus generated in response to execution of the decoded instructions for transmission to trace monitoring infrastructure; and throttle logic operable to predict whether issuing the decoded instruction to the execution logic for execution would be likely to cause the trace information to be transmitted to said trace monitoring infrastructure to exceed a capacity of said trace monitoring infrastructure and, if so, to prevent the decode/issue logic from issuing the decoded instruction to the execution logic. Accordingly, the throttle logic reviews each instruction to be executed and predicts whether issuing that instruction at that time will or is likely to cause the capacity to be exceeded. In the event that the throttle logic determines that the capacity is likely to be exceeded, the instruction is prevented from being issued to the execution logic which reduces the likelihood that any state information is lost.

23 Claims, 3 Drawing Sheets

PREVENTING LOSS OF TRACED INFORMATION IN A DATA PROCESSING APPARATUS

FIELD OF THE INVENTION

The present invention relates to techniques for preventing the loss of traced information in a data processing apparatus. Example embodiments described below prevent the loss of traced information being transmitted to trace monitor infrastructure.

BACKGROUND

Tracing the activity of a data processing system whereby a stream of trace elements is generated representing the step-by-step activity within the data processing system is a highly useful tool in system development. However, with the general move towards more deeply embedded processor cores, it becomes more difficult to track the architectural state of the processor core (such as the contents of registers, the values stored at particular memory locations or the status of various buses, paths, lines, flags or modules within processor core or to which the processor core is coupled) via externally accessible pins. Accordingly, as well as off-chip tracing mechanisms for capturing and analyzing architectural state information, increased amounts of tracing functionality are being placed on-chip. An example of such on-chip tracing mechanisms is the Embedded Trace Macrocell (ETM) provided by ARM Limited, Cambridge, England, in association with various of their ARM processors.

Such tracing mechanisms produce in real time a stream of trace elements representing activities of the data processing system that are desired to be traced. These trace elements can then subsequently be used to facilitate debugging of sequences of processing instructions being executed by the data processing system.

It is known to provide tracing mechanisms incorporating trigger points that serve to control the tracing operation, such as starting or stopping tracing upon access to a particular register, memory address, data value. Such mechanisms are very useful for diagnosing specific parts of a system or types of behavior.

Typically, when the trace is first triggered, the values of all items of architectural state information which may need to be reconstructed are traced. This architectural state information is typically provided from the processor to the ETM over a dedicated input bus. It will be appreciated that the trace bus has a maximum transmission bandwidth which can limit the amount of architectural state information that can be provided to the ETM at any one time.

Typically, the ETM generates a corresponding stream of trace elements representative of the architectural state information which is buffered in a trace buffer prior to output for subsequent analysis. Such a trace buffer is able to store a finite amount of trace elements and requires a dedicated output bus over which the trace elements to be output can be transmitted. The output bus also has a finite bandwidth. The trace buffer is generally arranged to store trace elements in a wrap-around manner, i.e. once the trace buffer is full, new data is typically arranged to overwrite the oldest data stored therein.

Typically, a trace analyzing tool is provided which then receives the trace elements from the trace buffer when desired; e.g. once the trace has completed. The trace analyzing tool can then reconstruct critical components of the architectural state information of the processor core using the stream of trace elements stored in the trace buffer. The trace analyzing tool can therefore reconstruct the behavior of the processor core based on the trace elements.

As data processing systems increase in power and complexity, it is clear that the rate of trace information will increase. Hence, in order to reliably reconstruct the architectural state information it will be appreciated that there is potentially a very large volume of trace elements that need to be generated.

Whilst it is possible to increase the size and performance of the ETM to deal with the increase in data to be processed, it will be appreciated that such increases are undesirable since this results in increased power consumption and is costly in chip area. Furthermore, it is generally desirable to minimize the resources dedicated to ancillary activities such as trace which are not utilized during normal operation of the data processing apparatus.

However, when executing trace, the limitations of the ETM and its infrastructure can result in trace information being lost under certain circumstances.

Debugging effort constitutes a significant cost in the development of new hardware and software systems and losing trace information increases this debugging effort.

Accordingly, it is desired to provide a technique which minimizes the loss of architectural state information being traced.

SUMMARY

Viewed from a first aspect, the present invention provides a data processing apparatus for processing instructions, the data processing apparatus comprising: decode/issue logic operable to receive and decode an instruction to be processed by the data processing apparatus and to determine when to issue a decoded instruction for execution; execution logic operable to execute the decoded instruction; interface logic selectively operable to receive trace information relating to the state of the data processing apparatus generated in response to execution of the decoded instruction for transmission to trace monitoring infrastructure; and throttle logic operable to predict whether issuing the decoded instruction to the execution logic for execution would be likely to cause the trace information to be transmitted to the trace monitoring infrastructure to exceed a capacity of the trace monitoring infrastructure and, if so, to prevent the decode/issue logic from issuing the decoded instruction to the execution logic.

The inventors recognized that the capacity or capabilities of the trace monitoring infrastructure is limited and that this limited capacity can prevent all the state information generated as a result of executing an instruction from being transmitted to the monitor logic. They also recognized that under typical operating conditions, the probability that the capacity will be exceeded is relatively low. Accordingly, whilst it would be possible to increase the capacity or performance of the trace monitoring infrastructure, such an increase is costly in terms of increased power consumption and the resources which must be allocated. The inventors further recognized that the situations in which the capacity is likely to be exceeded can be predicted. In particular, it is possible to predict whether issuing any particular instruction for execution at a particular time will result in the capacity of the trace monitoring infrastructure being exceeded.

Hence, there is provided throttle logic which reviews each instruction to be executed and determines whether issuing that instruction at that time will cause the capacity to be exceeded. In the event that the throttle logic determines that the capacity is likely to be exceeded, the instruction is temporarily prevented from being issued to the execution logic.

It will be appreciated that preventing instructions from being issued to the execution logic has an impact on the performance of the data processing apparatus. However, the inventors recognized that in normal operation the probability of each instruction causing the bandwidth to be exceeded is low. Accordingly, the rate at which instructions will be prevented from being issued will be low. Hence, the impact of this approach on the overall performance of the data processing apparatus is low. Furthermore, by preventing the capability of the trace monitoring infrastructure from being exceeded, any need to improve the performance of the trace monitoring infrastructure is obviated. Accordingly, the power consumption of the data processing apparatus need not be increased, nor does any increased chip area or on chip resources need to be allocated to the trace monitoring infrastructure.

Whilst it may be possible to provide a feedback mechanism from the trace monitoring infrastructure to the decode/issue logic to cause a temporary stall of the decode/issue logic in the event that the capacity of the trace monitoring infrastructure overflows or is approaching overflow, such a temporary stall is intrusive to the cycle-by-cycle operation of the data processing apparatus because the operation of the data processing apparatus would differ when trace is enabled from its operation when trace is not enabled. This makes it difficult to isolate cycle-by-cycle timing sensitive bugs whose effect is observed with the cycle-by-cycle timing when trace is disabled but whose effect is not observed with the cycle-by-cycle timing when trace is enabled.

In other cases a reduced cost part that does not include the trace monitoring infrastructure may be created for mass production. Such a reduced cost part is often required to run code with identical cycle-for-cycle timing to a part that does contain the trace monitoring infrastructure in order to reduce the likelihood of encountering bugs with the part that does not contain the trace monitoring infrastructure that cannot be reproduced on a part that does contain the trace monitoring infrastructure due to the timing change.

It is often found to be the case that changing the cycle-by-cycle operation of a data processing apparatus will mask the appearance of the bug and make it more difficult to pinpoint.

Thus it can be seen that a feedback mechanism intrusive to the operation of the data processing apparatus significantly reduces the usefulness of trace as an aide to debug because the cycle-by-cycle timing of the data processing apparatus differs when trace is enabled from when trace is not enabled.

Accordingly, in one embodiment, the throttle logic is operable to predict whether issuing the decoded instruction to the execution logic for execution would be likely to cause the trace information to be transmitted to the trace monitoring infrastructure to exceed a capacity of the trace monitoring infrastructure and, if so, to prevent the decode/issue logic from issuing the decoded instruction to the execution logic irrespective of whether the interface logic is selected to be operable to receive trace information.

Because the impact of the present approach on the overall performance of the data processing apparatus is low, it is possible to operate the throttle logic even when monitoring is not being performed. By operating the throttle logic in this way, the monitoring function is non-obtrusive since the data processing apparatus will operate in exactly the same way irrespective of whether monitoring is occurring or not. Hence, increased confidence can be obtained that the information received relating to the state of the data processing apparatus accurately reflects the operation of the data processing apparatus under normal operating conditions.

In one embodiment, the data processing apparatus is operable to issue multiple instructions in a single processing cycle, the decode/issue logic is operable to receive and decode the multiple instructions, and the throttle logic is operable to determine whether issuing each of the decoded multiple instructions in a single processing cycle to the execution logic for concurrent execution is likely to cause the trace information to be transmitted to the trace monitoring infrastructure to exceed the capacity of the trace monitoring infrastructure and, if so, to prevent the issue logic from issuing the one, a subset or all of the decoded instructions to the execution logic.

In a so-called super-scalar data processing apparatus which issues multiple instructions in a single processing cycle, the throttle logic can prevent multiple instructions from being issued to the execution logic when it is determined that issuing these multiple instructions in a single cycle will cause the maximum capacity to be exceeded. The issue of one, a subset or all of the instructions that are ready to issue may be prevented.

In one embodiment, the data processing apparatus is operable to issue multiple instructions in a single processing cycle, the decode/issue logic is operable to receive and decode the multiple instructions and the throttle logic is operable to determine whether issuing of the decoded multiple instructions in a single processing cycle to the execution logic for concurrent execution is likely to cause the trace information to be transmitted to the trace monitoring infrastructure to exceed the capacity of the trace monitoring infrastructure and, if so, to prevent the issue logic from issuing at least one of the decoded multiple instructions to the execution logic.

Hence, it will be appreciated that when issuing multiple instructions in the same cycle will cause the capacity to be exceeded, one or more of the multiple instructions may be prevented from being issued to the execution logic. Accordingly, when it is determined that the issue of the multiple instructions in the same cycle to the execution logic will result in the capability of the trace monitoring infrastructure being exceeded, the throttle logic can determine which, if any, of the multiple instruction should be allowed to be issued for execution.

In one embodiment, the data processing apparatus is operable to issue multiple instructions in a single processing cycle, the decode/issue logic is operable to receive and decode the multiple instructions, the execution logic comprises multiple execution pipelines operable to execute the multiple instructions concurrently and the issue logic is responsive to the determination made by the throttle logic to determine which of the multiple execution pipelines should be issued with decoded multiple instructions.

Accordingly, the throttle logic can select which of the multiple execution pipelines should be used for execution of the instructions.

In one embodiment, the data processing apparatus is operable to issue multiple instructions in a single processing cycle, the decode/issue logic is operable to receive and decode the multiple instructions, the execution logic comprises multiple execution pipelines operable to execute the multiple instructions concurrently and the issue logic is responsive to the determination made by the throttle logic to issue only a single decoded instruction during a single processing cycle.

Hence, when it is determined that the issue of multiple instructions in the same cycle will result in the capacity being exceeded, the throttle logic causes only a single instruction to be issued to the execution logic in a single processing cycle.

Typically, one of the execution pipelines will be designated for handling such single-issue instructions.

In one embodiment, the throttle logic is operable to determine whether issuing of the instruction to the execution logic for execution will cause the information to be transmitted to the trace monitoring infrastructure to exceed the capacity of the trace monitoring infrastructure and, if so, to prevent the issue logic from issuing the instruction to the execution logic.

Hence, when it is certain that the issue of the instruction to the execution logic will result in the performance required from trace monitoring infrastructure being exceeded then that instruction is being prevented from being issued to the execution logic. It will be appreciated that the an increased analysis of the instructions would need to be performed in order to only prevent instructions from being issued only when it is certain that the capacity will be exceeded but that this would further reduce the rate at which instructions are prevented from being issued.

In one embodiment, the throttle logic is operable to detect conditions under which issuing a decoded instruction is likely to cause the capacity of the trace monitoring infrastructure to be exceeded, the issue logic being operable to receive information indicative of the decoded instruction to be issued to the execution logic, to determine whether one of the conditions is satisfied and, if so, to prevent the issue logic from issuing the decoded instruction to the execution logic.

Accordingly, a convenient mechanism is provided whereby conditions under which the maximum capacity is likely to be exceeded, can be stored and then referenced upon receipt of a decoded instruction.

In one embodiment, the throttle logic is operable store conditions under which only a single decoded instruction should be issued during a single processing cycle to prevent the capacity of the trace monitoring infrastructure from being exceeded.

Hence, an indication is provided when the conditions are satisfied which require that single issue should occur in order to prevent the maximum capacity from being exceeded.

In one embodiment, the throttle logic is operable to store details of combinations of decoded instructions which are likely to cause the capacity of the trace monitoring infrastructure to be exceeded and the throttle logic is operable to prevent issuing decoded instructions to the execution logic in that combination.

Hence, an indication is provided of when a combination of decoded instructions is encountered which will cause the capacity to be exceeded if they are concurrently issued in the same cycle to the execution logic. Typically, the throttle logic will prevent one or more of those instructions from being issued until succeeding processing cycles.

In one embodiment, the throttle logic comprises storage logic operable to store an indication of previously issued decoded instructions, and is operable on receipt of decoded instructions to determine whether the decoded instructions in combination with the previously issued instructions are likely to cause the capacity of the trace monitoring infrastructure to be exceeded and, if so, the throttle logic is operable to prevent issuing decoded instructions to the execution logic in that combination.

By storing an indication of previously issued decided instructions, the throttle logic can readily determine when a combination of instructions has occurred which, if issued, is likely to cause the capacity to be exceeded.

In one embodiment, the decode/issue logic comprises the throttle logic.

Hence, the throttle logic can be provided as part of the decode issue logic.

In one embodiment, the decode/issue logic is operable to generate a decoded instruction having an indication of whether the decoded instruction should not issue in combination with any other decoded instruction in a single processing cycle and the throttle logic is responsive to that indication to cause the decode/issue logic to issue only the decoded instruction in a single processing cycle.

Hence, when decoding the instruction, it is possible to generate a predetermined indication for use by the throttle logic that under all circumstances that instruction should only issue as a single instruction in a single processing cycle.

In one embodiment, the trace monitoring infrastructure comprises a trace unit operable to receive the trace information.

In one embodiment, the trace unit further comprises a trace data output bus having a maximum transmission bandwidth and the throttle logic operable to determine whether issuing the decoded instruction to the execution logic for execution is likely to cause an indication of the trace information to be transmitted over the trace data output bus to exceed the maximum transmission bandwidth and, if so, to prevent the decode/issue logic from issuing the decoded instruction to the execution logic.

Hence, not only can state information be lost due to the capacity of the trace infrastructure being exceeded, but also a similar situation can arise if the maximum transmission of the trace data output bus bandwidth is exceeded. Accordingly, the throttle logic also causes instructions to be prevented from being issued to the execution logic when it is likely that the trace data output bus bandwidth is exceeded.

In one embodiment, the trace information comprises architectural state information.

In one embodiment, the data processing apparatus further comprises the trace monitoring infrastructure, the trace monitoring infrastructure comprising a trace unit operable to receive the trace information.

Accordingly, the trace monitoring infrastructure may be provided as part of the data processing apparatus.

In one embodiment, the trace unit further comprises a trace data output bus having a maximum transmission bandwidth and the throttle logic operable to determine whether issuing the decoded instruction to the execution logic for execution is likely to cause the trace information to be transmitted over the trace data output bus to exceed the maximum transmission bandwidth and, if so, to prevent the decode/issue logic from issuing the decoded instruction to the execution logic.

In one embodiment, the trace monitoring infrastructure comprises at least one trace bus, the at least one trace bus having a maximum transmission bandwidth, the interface logic is operable to receive the trace information for transmission over the at least one trace bus to the trace monitoring infrastructure and the throttle logic is operable to determine whether issuing the decoded instruction to the execution logic for execution is likely to cause the trace information to be transmitted over the at least one trace bus to exceed the maximum transmission bandwidth and, if so, to prevent the decode/issue logic from issuing the decoded instruction to the execution logic.

In one embodiment, the trace monitoring infrastructure comprises a trace unit, the trace unit having a maximum processing capability, the interface logic is operable to receive the trace information for transmission to the trace unit and the throttle logic is operable to determine whether issuing the decoded instruction to the execution logic for execution is likely to cause the trace information to be transmitted to the trace unit to exceed the maximum processing capability and, if so, to prevent the decode/issue logic from issuing the decoded instruction to the execution logic.

In one embodiment, the trace monitoring infrastructure comprises at least one trace bus and the trace unit, the at least one trace bus having a maximum transmission bandwidth and the trace unit having a maximum processing capability, the interface logic is operable to receive the trace information for transmission over the at least one trace bus to the trace unit and the throttle logic is operable to determine whether issuing the decoded instruction to the execution logic for execution is likely to cause the trace information to be transmitted over the at least one trace bus to the monitor logic to exceed the maximum transmission bandwidth and the maximum processing capability and, if so, to prevent the decode/issue logic from issuing the decoded instruction to the execution logic.

In one embodiment, the throttle logic is operable to determine whether the decoded instruction falls within a predefined subset of instruction which, if prevented from being issued, will cause unacceptable performance of the data processing apparatus and, if so, to enable that instruction to be issued even though the capacity of the trace infrastructure is likely to be exceeded.

Hence, any performance critical instructions may be allowed to be issued even though this may result in the loss of trace information. It will be appreciated that the loss of trace information due to the limited capacity of the trace monitor infrastructure does not cause an error in the operation of the data processing apparatus, it simply makes trace information temporarily unavailable to aid in debugging.

In one embodiment, the throttle logic is operable to prevent a subset of the conditions that could cause the maximum transmission bandwidth to be exceeded.

Accordingly conditions that do not significantly reduce the performance of the data processing apparatus may be prevented from causing the maximum trace monitoring infrastructure transmission bandwidth to be exceeded and trace information to be lost, whilst conditions that do significantly effect the performance of the data processing apparatus but cause the maximum transmission bandwidth to be exceeded are not prevented in order to avoid significantly reducing the performance of the data processing apparatus. It will be appreciated that this allows more trace information to be provided than if the throttle logic were not implemented and none of the conditions that cause the maximum trace bus transmission bandwidth to be exceeded.

In one embodiment, the throttle logic is operable to prevent conditions that could cause the maximum transmission bandwidth of an on-chip trace bus from being exceeded.

In one embodiment, the throttle logic is operable to prevent conditions that could cause the maximum transmission bandwidth of an off-chip trace bus from being exceeded.

In one embodiment, the throttle logic is operable to prevent conditions that could cause transmission bandwidth of multiple trace buses potentially including off chip interfaces from being exceeded.

In one embodiment, the throttle logic is operable to prevent conditions that could cause the capacity of logic in a trace module from being exceeded.

Viewed from a second aspect, there is provided a method of controlling the quantity of trace information generated for transmission to trace monitoring infrastructure, the trace information relating to the state of a data processing apparatus being generated in response to execution of a decoded instruction by execution logic, the method comprising the steps of: receiving and decoding an instruction to be processed by the data processing apparatus; predicting whether issuing the decoded instruction to the execution logic for execution would be likely to cause the trace information required to be transmitted to the trace monitoring infrastructure to exceed a capacity of the trace monitoring infrastructure and, if so, to prevent the decoded instruction from being issued to the execution logic.

Viewed from a third aspect there is provided a data processing apparatus for processing instructions, the data processing apparatus comprising: means for receiving and decoding an instruction to be processed by the data processing apparatus and for determining when to issue a decoded instruction for execution; means for executing the decoded instruction; means for selectively receiving state information relating to the state of the data processing apparatus generated in response to execution of the decoded instruction for transmission to trace monitoring infrastructure; and means for determining whether issuing the decoded instruction to the execution logic for execution is likely to cause the trace information required to be transmitted to the trace monitoring infrastructure to exceed a capacity of the trace monitoring infrastructure and, if so, for preventing the decode/issue logic from issuing the decoded instruction to the execution logic.

DETAILED DESCRIPTION

Figure 1:
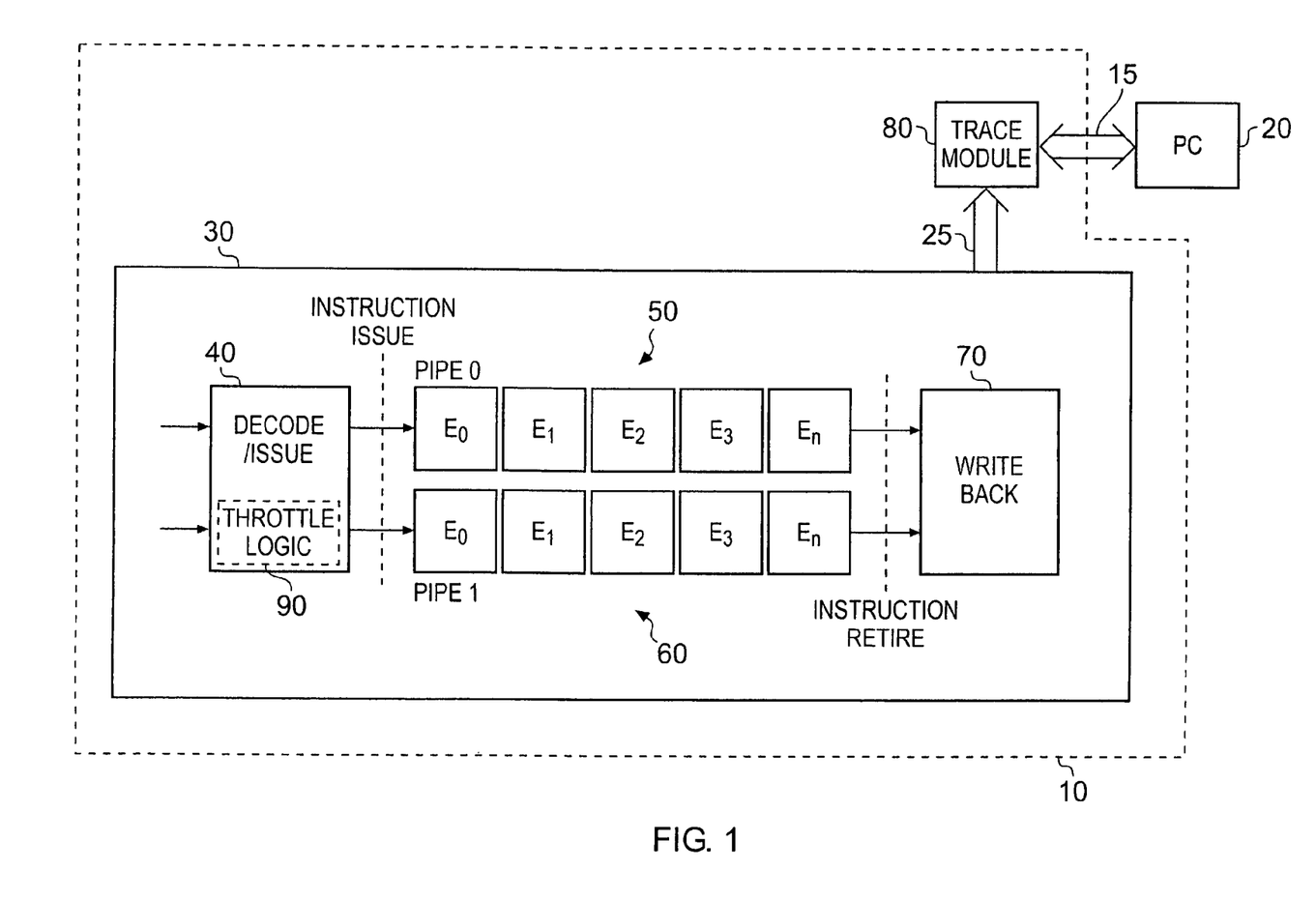
FIG. 1 illustrates the arrangement of a data processing apparatus according to an embodiment of the present invention.

FIG. 1 shows a data processing apparatus 10 coupled via an external trace bus 15 with a trace analyzing tool running on, for example, a personal computer 20. The data processing apparatus 10 comprises a processor core 30. The processor core 30 is a super-scalar processor in which multiple instructions may be issued in a single processing cycle. The processor core 30 has a first execution pipeline 50 and a second execution pipeline 60. More than two execution pipelines may be provided. Instructions are processed in program order, with older instructions being issued to execution pipeline 50 and younger instructions being issued to execution pipeline 60. It will be appreciated that other embodiments may process instructions out of program order.

The processor core 30 has decode/issue logic 40 which receives, from preceding stages, instructions to be decoded for issue in the subsequent processing cycle. For example, the instructions may be received from fetch or prefetch logic (not shown).

The decode/issue logic 40 maintains a scoreboard (not shown) which provides an indication of resources (such as registers, logical or arithmetic units, address generation units etc.) which may be reserved at any point in time for use by instructions which have already been issued. As each instruction is issued, the scoreboard provides an indication of which resources are in use by that instruction and a prediction of when those resources will become available for use by subsequent instructions. Prior to issuing each instruction, the decode/issue logic 40 refers to the scoreboard and times the issue of that instruction such that the resources are expected to be available when required by that instruction.

However, in some circumstances, the prediction made by the decode/issue logic 40 at the time of issuing an instruction may be incorrect. For example, an assumption may be made that an item of data is stored in a level 1 cache, but the access causes a cache miss. Hence, the instruction and subsequent instructions may be executed using incorrect data. Accordingly, the decode/issue logic 40 also maintains a recovery mechanism (not shown) which provides details of the instructions being executed in the different execution stages of the execution pipelines. The recovery mechanism can then be used in order to enable the pipeline to be restarted when it is detected that an error has occurred during the processing of the instructions in the pipeline.

The processor core 30 is an in-order processor. Assuming that the scoreboard indicates to the decode/issue logic 40 that multiple decoded instructions can be issued to the execution pipeline stages, the older instruction will always be issued to pipeline 50, with the younger instruction being issued to pipeline 60.

When an instruction successfully completes execution through the execution pipeline, the instruction passes from the last execution stage to the write back logic 70 to enable the architectural state generated by that instruction to be committed. Assuming no error signals have been generated, architectural state affected by the instruction is committed such that registers, control signals, values stored at particular memory locations, etc, are then updated and the instruction retires. When the architectural state is updated, this architectural state is provided over an internal trace bus 25 to a trace module 80.

The internal trace bus 25 coupling the processor core 30 with the trace module 80 has a finite bandwidth. Accordingly, the bus 25 can only transmit architectural state information to the trace module 80 at a particular predetermined maximum rate. Hence, should the amount of architectural state generated at any particular time exceed the maximum bandwidth of the internal trace bus 25, it becomes no longer possible to transmit all of the architectural state information to the trace module 80 in the time available. Hence, some of that architectural state information may not be available to the trace module 80 since it cannot be transmitted over the internal trace bus 25. It will be appreciated that this would not prevent the correct execution of the instruction or the correct operation of the processor core 30 but it may result in a loss of trace information available to the personal computer 20. This could reduce the benefit of the trace information to a system designer attempting to analyze or debug hardware or software.

Similarly, the trace module 80 is coupled via the external trace bus 15 to an off-chip trace analyzing tool running on the personal computer 20. It will be appreciated that whilst it is possible to operate the internal trace bus 25 at a high clock speed, the speed of the external trace bus 15 is likely to be significantly lower in a typical system, under typical operating conditions.

Whilst techniques exist for reducing the amount of data required to be transmitted over these buses, situations can still occur whereby the data required to be transmitted exceeds the maximum bandwidth available. Also, even if the bandwidth of the buses could be increased to accommodate the data, the performance of the trace module 80 or the personal computer 20 may not be sufficient to enable all of that data to be processed.

Hence, throttle logic 90 is provided within the decode/instruction logic 40 which helps to prevent the maximum transmission bandwidth of the bus 25 and/or the bus 15 from being exceeded. The throttle logic 90 also helps prevent the maximum processing capacity of the trace module 80 and/or the personal computer 20 from being exceeded.

The throttle logic 90 achieves this by identifying instructions which, if issued to the execution pipelines 50, 60 will cause architectural state to be generated in a quantity which it will not be possible to provide to the trace module 80 or to the personal computer 20 given the maximum transmission bandwidth and processing capacity available. Hence, in those situations, the throttle logic 90 will reduce the number of instructions being issued in order to reduce the amount of architectural state which will be generated in any particular processing cycle. Accordingly, multiple instructions can be prevented from being concurrently processed in the same processing cycle within the execution pipelines and instead as sub-set of these instructions will be issued with the remaining instructions being issued at an appropriate time thereafter. Also, instructions can be prevented from being issued at all for a particular period.

The operation of the throttle logic 90 will now be described in more detail with reference to FIG. 2 which illustrates in more detail the decode/issue logic 40.

The decode/issue logic 40 comprises decode logic 42 and 44 each of which receives a respective instruction from a preceding processing stage. The decode logic 42 and 44 decodes each instruction and generates a number of control signals for use in the subsequent processing of those instructions. In the event that the decode logic 42 and 44 validly decode the instructions provided, a valid instruction signal is output over the paths 51 and 53 respectively to a respective input of AND gates 45 and 47.

Issue logic 46 is used to determine which instructions should be issued to the execution pipelines 50 and 60. The issue logic 46 will perform a number of logical and data dependency checks on the decoded instructions, taking into account issued instructions still being executed in the execution pipelines. The issue logic 46 can enable either instruction 0, or instruction 1, or both instructions to be issued to the execution pipelines 50 and 60, as appropriate.

Also provided is throttle logic 90. The throttle logic 90 is provided to further restrict the issue of instructions into the execution pipelines when it is expected that to do so will likely cause the maximum transmission bandwidths of the internal trace bus 25 or the external trace bus 15 being exceeded, or the processing capacity of the trace module 80 or the personal computer 20 being exceeded. The throttle logic 90 comprises single issue check logic 92 (provided within the decode logic 42) and single issue check logic 94 (provided within the decode logic 44), together with dependency check logic 96.

The single issue check logic 92 forms part of the decode logic 42. When it is detected (as part of decoding an instruction) that that instruction is one which should always be single issued, an indication is sent to the issue logic 46 to indicate that the instruction should single issue. In addition, the dependency check logic 96 checks the two instructions being decoded to determine if they will correctly execute if they are issued together.

Figure 2:
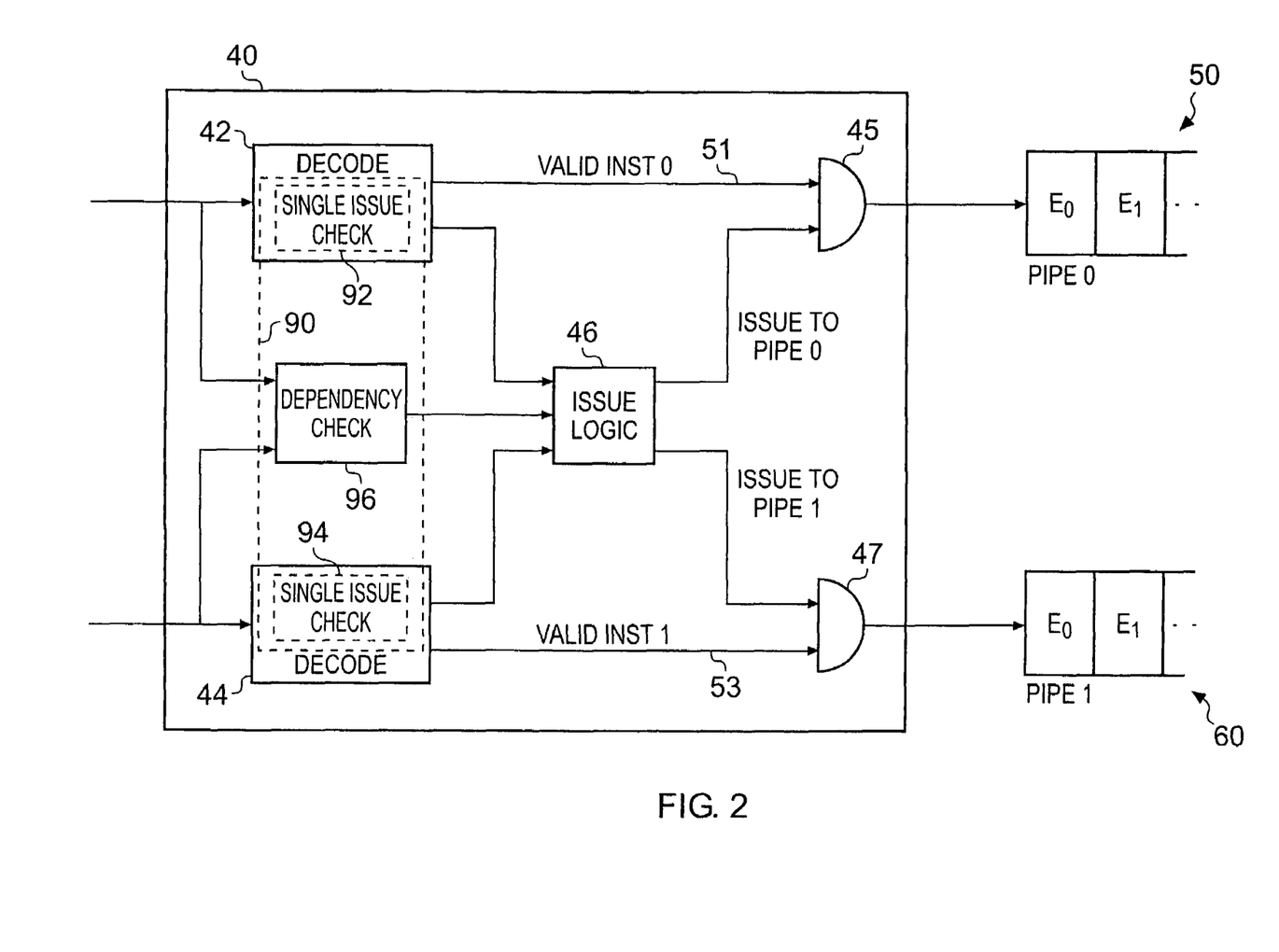
FIG. 2 illustrates in more detail the arrangement of the decode/issue logic of FIG. 1.

FIG. 2 shows the dependency check logic 96 operating on the instruction input to the decode/issue logic 40 but it will also be appreciated that it could be implemented to operate on the outputs of the decode/issue logic 40 or a combination of the two.

The issue logic 46 receives the indications from the decoders 42, 44 and dependency check logic 96 and determines for each of the instruction if it should issue at the beginning of the next cycle.

In this embodiment an indication from the older instruction decode logic 42 that the instruction should single issue or an indication from the dependency check logic 96 that the two instructions cannot issue together and correctly execute but that there is no other reason to not issue the older instruction will result in the older instruction being issued to pipe 0 but the younger instruction not being issued. In the following cycle the younger instruction will become the older instruction, a new younger instruction will take its place and the above conditions will be re-evaluated to determine which instructions will issue in the following cycle, and so on.

In this embodiment, throttle logic 90 forms part of the decoder 42, 44 and the dependency check logic 96. This logic detects when the issue of one or both of two instructions being considered for issue will likely or always result in the transmission bandwidth of the trace buses 25 and 15 or the processing capacity of the trace module 80 or personal computer 20 being exceeded if they are issued. When such a condition is detected the indications sent to the issue logic 46 are set such that the issue of no or one instruction, as appropriate, will result so as to reduce or eliminate the possibility of the bandwidth of the trace buses 25 and 15 or the processing capacity of the trace module 80 or personal computer 20 being exceeded in the future as a result of operation of the issue logic 46 in that cycle.

However, it will be appreciated that it is desirable that the number of such instructions is reduced to a minimum in order to prevent any significant impact on the performance of the data processing apparatus 10.

The dependency check logic 96 also receives an indication of the decoded instructions to be issued. Whilst it is illustrated that these are received as signals from the preceding stages, it will be appreciated that some or all of these signals could instead have been provided by the decode logic 42 and 44. It will also be appreciated that the signals from the preceding stages could carry the instructions encoded in the same manner as they are stored in memory or in another form. In particular, they may be in a partially decoded.

The dependency check logic 96 effectively maintains a lookup table (not shown) which provides an indication of those combinations of instructions which should not be issued together into the execution pipeline since as to do so would likely cause the transmission bandwidth of the buses 25 and 15 or the processing capacity of the trace module 80 or personal computer 20 to be exceeded. Hence, the dependency check logic 96 can ensure that when a combination of instructions is received in a single cycle which, if issued together to the execution pipeline in the same processing cycle will cause the transmission bandwidth to be exceeded, then these instructions are only single issued.

The dependency check logic 96 also maintains a record of the instructions currently being processed in the execution pipelines (i.e. those instructions which have been issued but not yet retired).

Accordingly, when the dependency check logic 96 receives one or more decoded instructions to be issued to the execution pipeline, the lookup table provides an indication of whether issuing these one or more decoded instructions will cause a condition whereby the presence of these instructions in combination with a previous instruction somewhere in the execution pipeline will most likely cause the transmission bandwidth of the buses 25 and 15 or the processing capacity of the trace module 80 or personal computer 20 to be exceeded.

Figure 3:
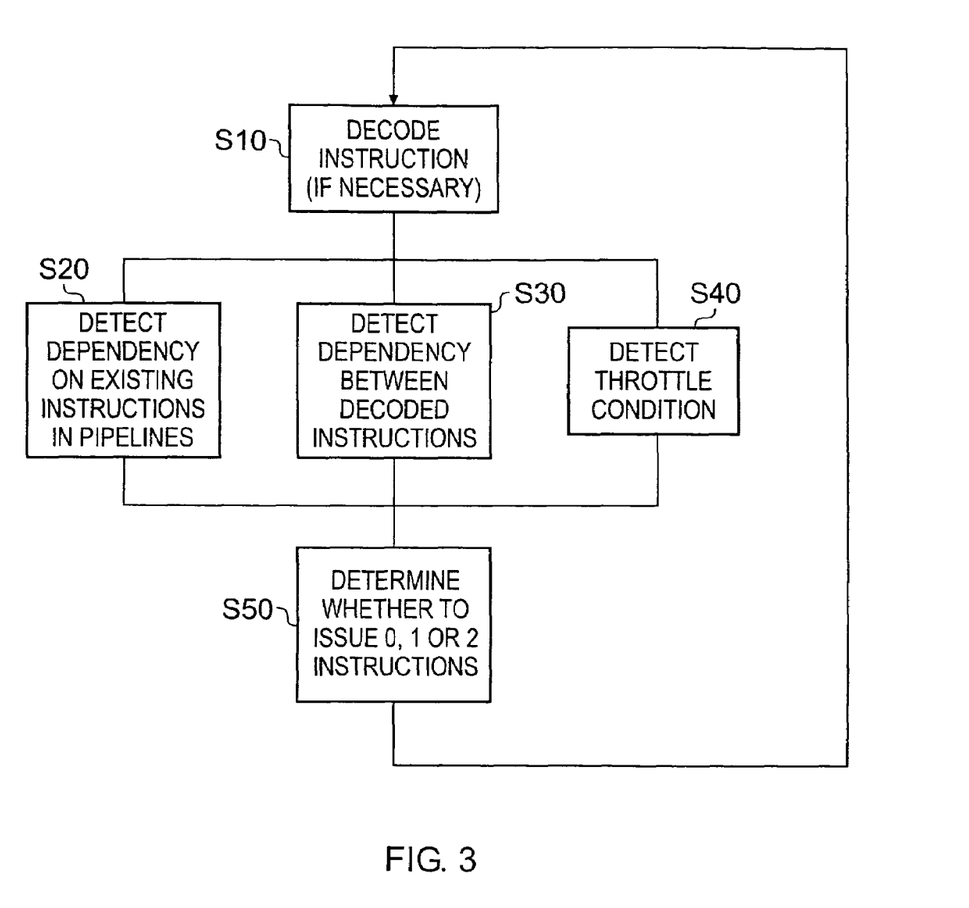
FIG. 3 is a flow diagram illustrating the operation of the throttle logic illustrated in FIG. 2.

FIG. 3 is a flow chart illustrating the operation of the decode/issue logic 40 incorporating the throttle logic 90 in more detail.

At S10, the decode logic 40, 42 will decode the instruction or instructions when received.

Thereafter, the single issue check logic 92, 94 will determine if the decoded instructions are a type that should always single issue, as illustrated at step S20.

In addition dependency check logic 96 will detect, as illustrated at step S30, whether there is any data or logical dependency between the decoded instruction or instructions and any other instructions currently being executed in the pipeline. It will be appreciated that this dependency detection is a standard procedure for such a super scalar single issue pipeline processor arrangements.

In parallel, the detect throttle condition logic 90 will, as illustrated by step S40, detect if the issue of either or both of the decoded instructions could result in the transmission bandwidth of the internal trace bus 25 or external trace bus 15 being exceeded or the capacity of logic in the trace module 80 or the personal computer 20 being exceeded.

The issue logic 46 will then, as illustrated by step S50, determine that one or more of the decoded instructions should not be issued to the execution pipeline or pipelines.

Thereafter, step S10 is returned to in order to enable the determination to be made again for the next processing cycle.

It will be appreciated that the throttling technique provided enables a determination to be made of when unnecessary loading will occur on the transmission buses 25 and 15 which will either definitely or very likely result in the transmission bandwidth being exceeded, thereby resulting in data which is required to be transmitted over the buses 25 and 15 being lost. The throttling technique provided also enables a determination to be made of when unnecessary loading will occur on the capacity of logic in the trace module 80 or the personal computer 20 which will either definitely or very likely result the processing ability of these devices being exceeded which may cause those devices to operate incorrectly or cause trace information to be lost. This is achieved by providing throttle logic 90 which detects and prevents the occurrence of combinations of instructions which, if issued to the execution pipelines 50 and 60, would cause an amount of data being generated which cannot simply be transmitted in time over the buses 25 and 15 or handled by the trace module 80 or the personal computer 20. Preventing the instructions from being issued to the execution pipeline 50 and 60 ensures or increases the likelihood that only a manageable amount of change in architectural state is generated in any given processing cycle. Whilst preventing instructions from being issued will clearly have an impact on the performance of the data processing apparatus 10, this reduction in performance is typically negligible since the combinations of instructions which need to be prevented from being issued is set to be relatively small and they occur relatively rarely. Also, this small reduction in performance is more than compensated for by enabling significantly lower bandwidth buses being required and, as a consequence, a significantly lower performance trace module 80 being required which is able to handle the data at the rate provided. Having a simplified or lower performance trace module 80 reduces the amount of power consumed and also significantly reduces the amount of chip area required to implement the trace module 80. Also, because the reduction in performance is negligible, the throttle logic 90 may be activated even when tracing is not being performed. Also, tracing becomes more reliable because either no or just a reduced amount of state information is ever lost due to bandwidth constraints. Also, constantly operating the throttle logic 90 causes the data processing apparatus 10 to operate in exactly the same way irrespective of whether tracing is occurring or not. Accordingly, an increased confidence can be achieved that the information received relating to the state and operation of the data processing apparatus 10 accurately reflects the actual operation of the data processing apparatus even when operating under non-traced conditions. Hence, the tracing function can be assumed to be non-intrusive.

Although non-limiting example embodiments have been described herewith, it will be apparent that the invention is not limited thereto, and that many modifications and additions may be made within the scope of the invention.

We claim:

1. A data processing apparatus for processing instructions, said data processing apparatus comprising:

decode/issue logic configured to receive and decode an instruction to be processed by said data processing apparatus and to determine when to issue a decoded instruction for execution;

execution logic configured to execute said decoded instruction;

interface logic selectively operable to receive trace information relating to the state of said data processing apparatus generated in response to execution of said decoded instruction for transmission to trace monitoring infrastructure; and throttle logic configured to predict whether issuing said decoded instruction to said execution logic for execution would be likely to cause said trace information to be transmitted to said trace monitoring infrastructure to exceed a capacity of said trace monitoring infrastructure and, if so, to prevent said decode/issue logic from issuing said decoded instruction to said execution logic irrespective of whether said interface logic is selected to be operable to receive trace information such that a cycle-by-cycle timing behavior of said data processing apparatus does not substantially differ when said interface logic is enabled to receive trace information and when said interface logic is not enabled to receive trace information.

2. The data processing apparatus as claimed in claim 1, wherein said data processing apparatus is configured to issue multiple instructions in a single processing cycle, said decode/issue logic is configured to receive and decode said multiple instructions, and said throttle logic is configured to determine whether issuing said decoded multiple instructions in a single processing cycle to said execution logic for concurrent execution is likely to cause said trace information to be transmitted to said trace monitoring infrastructure to exceed the capacity of said trace monitoring infrastructure and, if so, to prevent said issue logic from issuing said decoded multiple instructions to said execution logic.

3. The data processing apparatus as claimed in claim 1, wherein said data processing apparatus is configured to issue multiple instructions in a single processing cycle, said decode/issue logic is configured to receive and decode said multiple instructions and said throttle logic is configured to determine whether issuing of said decoded multiple instructions in a single processing cycle to said execution logic for concurrent execution is likely to cause said trace information to be transmitted to said trace monitoring infrastructure to exceed the capacity of said trace monitoring infrastructure and, if so, to prevent said issue logic from issuing at least one of said decoded multiple instructions to said execution logic.

4. The data processing apparatus as claimed in claim 1, wherein said data processing apparatus is configured to issue multiple instructions in a single processing cycle, said decode/issue logic is configured to receive and decode said multiple instructions, said execution logic comprises multiple execution pipelines configured to execute said multiple instructions concurrently and said issue logic is responsive to the determination made by said throttle logic to determine which of said multiple execution pipelines should be issued with decoded multiple instructions.

5. The data processing apparatus as claimed in claim 1, wherein said data processing apparatus is configured to issue multiple instructions in a single processing cycle, said decode/issue logic is configured to receive and decode said multiple instructions, said execution logic comprises multiple execution pipelines configured to execute said multiple instructions concurrently and said issue logic is responsive to the determination made by said throttle logic to issue only a single decoded instruction during a single processing cycle.

6. The data processing apparatus as claimed in claim 1, wherein said throttle logic is configured to determine whether issuing of said instruction to said execution logic for execution will cause said trace information to be transmitted to said trace monitoring infrastructure to exceed the capacity of said trace monitoring infrastructure and, if so, to prevent said issue logic from issuing said instruction to said execution logic.

7. The data processing apparatus as claimed in claim 1, wherein said throttle logic is configured to detect conditions under which issuing a decoded instruction is likely to cause said capacity of said trace monitoring infrastructure to be exceeded, said issue logic being configured to receive information indicative of said decoded instruction to be issued to said execution logic, to determine whether one of said conditions is satisfied and, if so, to prevent said issue logic from issuing said decoded instruction to said execution logic.

8. The data processing apparatus as claimed in claim 7, wherein said throttle logic is configured to store conditions under which only a single decoded instruction should be issued during a single processing cycle to prevent the capacity of said trace monitoring infrastructure from being exceeded.

9. The data processing apparatus as claimed in claim 7, wherein said throttle logic is configured to store details of combinations of decoded instructions which are likely to cause said capacity of said trace monitoring infrastructure to be exceeded and said throttle logic is configured to prevent issuing decoded instructions to said execution logic in that combination.

10. The data processing apparatus as claimed in claim 9, wherein said throttle logic comprises storage logic configured to store an indication of previously issued decoded instructions, and is configured on receipt of decoded instructions to determine whether said decoded instructions in combination with said previously issued instructions are likely to cause said capacity of said trace monitoring infrastructure to be exceeded and, if so, said throttle logic is configured to prevent issuing decoded instructions to said execution logic in that combination.

11. The data processing apparatus as claimed in claim 1, wherein said decode/issue logic comprises said throttle logic.

12. The data processing apparatus as claimed in claim 1, wherein said decode/issue logic is configured to generate an issuance-indicated decoded instruction having an indication of whether said decoded instruction should not issue in combination with any other decoded instruction in a single processing cycle and said throttle logic is responsive to that indication to cause said decode/issue logic to issue only said issuance-indicated decoded instruction in a single processing cycle.

13. The data processing apparatus as claimed in claim 1, wherein said trace monitoring infrastructure comprises a trace unit operable to receive said trace information.

14. The data processing apparatus as claimed in claim 13, wherein said trace unit further comprises a trace data output bus having a maximum transmission bandwidth and said throttle logic configured to determine whether issuing said decoded instruction to said execution logic for execution is likely to cause said trace information to be transmitted over said trace data output bus to exceed said maximum transmission bandwidth and, if so, to prevent said decode/issue logic from issuing said decoded instruction to said execution logic.

15. The data processing apparatus as claimed in claim 13, wherein said trace information comprises architectural state information.

16. The data processing apparatus as claimed in claim 1, further comprising said trace monitoring infrastructure, said trace monitoring infrastructure comprising a trace unit configured to receive said trace information.

17. The data processing apparatus as claimed in claim 16, wherein said trace unit further comprises a trace data output bus having a maximum transmission bandwidth and said throttle logic configured to determine whether issuing said decoded instruction to said execution logic for execution is likely to cause said trace information to be transmitted over said trace data output bus to exceed said maximum transmission bandwidth and, if so, to prevent said decode/issue logic from issuing said decoded instruction to said execution logic.

18. The data processing apparatus as claimed in claim 1, wherein said trace monitoring infrastructure comprises at least one trace bus, said at least one trace bus having a maximum transmission bandwidth, said interface logic is selected to be operable to receive said trace information for transmission over said at least one trace bus to said trace monitoring infrastructure and said throttle logic is configured to determine whether issuing the decoded instruction to the execution logic for execution is likely to cause said trace information to be transmitted over said at least one trace bus to exceed said maximum transmission bandwidth and, if so, to prevent said decode/issue logic from issuing the decoded instruction to the execution logic.

19. The data processing apparatus as claimed in claim 1, wherein said trace monitoring infrastructure comprises a trace unit, said trace unit having a maximum processing capability, said interface logic is selected to be operable to receive said trace information for transmission to said trace unit and said throttle logic is configured to determine whether issuing the decoded instruction to the execution logic for execution is likely to cause said trace information to be transmitted to said trace unit to exceed said maximum processing capability and, if so, to prevent said decode/issue logic from issuing the decoded instruction to the execution logic.

20. The data processing apparatus as claimed in claim 1, wherein said trace monitoring infrastructure comprises at least one trace bus and a trace unit, said at least one trace bus having a maximum transmission bandwidth and said trace unit having a maximum processing capability, said interface logic is selected to be operable to receive said trace information for transmission over said at least one trace bus to said trace unit and said throttle logic is configured to determine whether issuing the decoded instruction to the execution logic for execution is likely to cause said trace information to be transmitted over said at least one trace bus to said trace unit to exceed said maximum transmission bandwidth and maximum processing capability and, if so, to prevent said decode/issue logic from issuing the decoded instruction to the execution logic.

21. The data processing apparatus as claimed in claim 1, wherein said throttle logic is configured to determine whether said decoded instruction falls within a predefined subset of instructions which, if prevented from being issued, will cause unacceptable performance of said data processing apparatus and, if so, to enable that instruction to be issued even though the capacity of said trace infrastructure is likely to be exceeded.

22. A method implemented in a data processing apparatus of controlling the quantity of trace information generated for transmission to trace monitoring infrastructure, said trace information relating to the state of the data processing apparatus being generated in response to execution of a decoded instruction by execution logic, said method comprising:
  receiving and decoding an instruction to be processed by said data processing apparatus;
  selectively operating interface logic to receive trace information relating to the state of said data processing apparatus generated in response to execution of said decoded instruction for transmission to trace monitoring infrastructure; and
  predicting whether issuing said decoded instruction to said execution logic for execution would be likely to cause said trace information required to be transmitted to said trace monitoring infrastructure to exceed a capacity of said trace monitoring infrastructure and, if so, using said prediction to prevent said decoded instruction from being issued to said execution logic irrespective of whether said interface logic is selected to be operable to receive trace information such that a cycle-by-cycle timing behavior of said data processing apparatus does not substantially differ when said interface logic is enabled to receive trace information and when said interface logic is not enabled to receive trace information.

23. A data processing apparatus for processing instructions, said data processing apparatus comprising:
  means for receiving and decoding an instruction to be processed by said data processing apparatus and for determining when to issue a decoded instruction for execution;
  means for executing said decoded instruction;
  means selectively operable for receiving trace information relating to the state of said data processing apparatus generated in response to execution of said decoded instruction for transmission to trace monitoring infrastructure; and
  means for determining whether issuing said decoded instruction to said execution logic for execution is likely to cause said trace information required to be transmitted to said trace monitoring infrastructure to exceed a capacity of said trace monitoring infrastructure and, if so, for preventing said decode/issue logic from issuing said decoded instruction to said execution logic irrespective of whether said means selectively operable for receiving trace information is selected to be operable to receive trace information such that a cycle-by-cycle timing behavior of said data processing apparatus does not substantially differ when said interface logic is enabled to receive trace information and when said interface logic is not enabled to receive trace information.

* * * * *